Sept. 30, 1958  A. BOSCHI  2,854,232

COMPRESSION SPRINGS

Filed Dec. 1, 1953

INVENTOR.
ANTONIO BOSCHI.

BY Stone, Boyden & Mack
ATTORNEYS.

United States Patent Office 2,854,232
Patented Sept. 30, 1958

2,854,232

COMPRESSION SPRINGS

Antonio Boschi, Milan, Italy, assignor to Societa Applicazioni Antivibranti S. A. G. A. Societa per Azioni, Milan, Italy Application December 1, 1953, Serial No. 395,569

Claims priority, application Italy December 11, 1952

3 Claims. (Cl. 267—63)

This invention pertains to rubber springs, working under compression, and more particularly has reference to springs which consist of a series of annular rubber rings, superimposed upon each other, and held in load-axial alignment by a series of annular metal rings, each of which is inserted between an adjacent pair of rubber rings.

In springs of this type, the principal objectives are:

(1) To contain with acceptable limits the lateral deformation of the rubber rings, when the spring is working under load;

(2) To obtain for each ring a favorable form factor, best suited to the particular spring;

(3) To obtain, as nearly as possible, a uniform stress throughout the rubber composing the elastic rings, when the spring is working under load.

In order to achieve the last mentioned objective, it is essential that the ratio between the radial width and internal diameter of each rubber ring be made such as to obtain the required lateral deformation of the ring, in both inward and outward radial directions. If the internal diameter is too small, in respect to the radial width, of the ring, axial compression of the ring under load produces circumferential (tangential) stresses in the inner portion of the ring which oppose its radial inward deformation, and there results what is known as a "stuffing effect," which by increasing the density and resistance of the rubber in the inner portion of the ring, makes said portion less compresible than the outer portion, so that the ring tends to deform only in an outward radial direction.

This stuffing effect produces three principal undesirable results:

(a) Non-uniform working of the rubber, with consequent stress points which reduce its durability;

(b) Lateral movement of the ring in only one direction (outwardly), which increases the wearing of the rubber and the difficulty of maintaining the several rings of the spring in load-axial alignment; and (c) Increases the tendency of the separating metal rings to bend conically in an outward radial direction, owing to the outwardly decreasing stiffness of the rubber rings.

In order to overcome the foregoing faults in prior art springs of the indicated type, it has been necessary to increasingly reduce the radial width of the rubber rings, as their internal diameter is decreased, and to increase the number of concentric rubber rings in each layer between each pair of adjacent metal rings, which inherently increases the cost and the space required to accommodate the spring.

In order to reduce the cost and space required for a spring, it is desirable to reduce the number of rubber rings in each layer to one, and thereby decrease both the cost and space required by the spring.

Accordingly, the principal objects of this invention are to provide an improved spring, having only one rubber ring in each layer (between adjacent metal rings), which achieves the desirable objectives mentioned above, and also avoids the undesirable results of the stuffing effect, indicated above.

With these and other objects in view which may be incident to my improvements, my invention consists in the combination and arrangement of elements described hereinbelow and illustrated in the accompanying drawing, in which.

Figure 1:
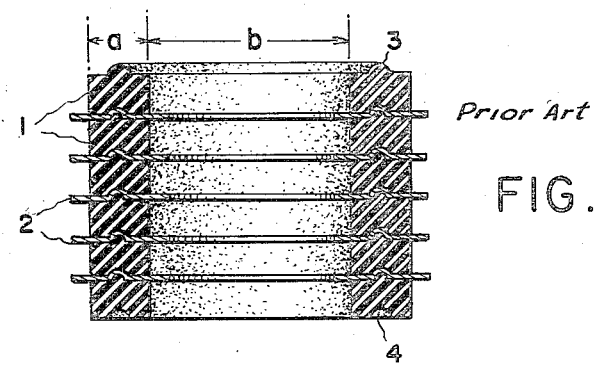
Figure 1 is a vertical cross-section of a typical prior art spring of the type whereof my invention is an improvement.

Referring first to Figure 1, the reference numeral 1 denotes one of a series of identical annular rubber rings, each having a radial width "a" and an internal diameter "b." Interposed between each pair of rubber rings 1, is an annular metal ring 2, having a somewhat greater radial width and smaller internal diameter than the rubber rings. In the center of its section, each rubber ring 1 has on its upper surface a molded ridge 3, and on its lower surface a molded groove 4, which register with corresponding grooves and ridges in abutting metal rings 2, when the spring is in assembled working position, as shown in Figure 1. These ridges and grooves function to prevent lateral movement of the rubber rings with respect to their abutting metal rings, and thus keep all of the rings in load-axial alignment. To the same ends, each rubber ring may be vulcanized or otherwise attached to its abutting metal rings.

The principal disadvantages of prior art springs of the type shown in Figure 1 are that they have heretofore been attended with the undesirable results caused by the stuffing effect of the rubber rings, when working under load, as mentioned above. In order to overcome this stuffing effect, I have devised the novel form of rubber ring, shown in plan in Figure 3, wherein the similar reference characters denote the corresponding elements in Figure 1.

The inner portion of ring 1a, inside of ridge 3a, is provided with a series of identical recesses or openings 5a, in the nature of generally V-shaped notches whose width "c" decreases radically outward, and whose depth "d" extends from the inner periphery of the ring 1a to approximately its neutral stress line (near its mid-portion), where the deformation of the rubber reverses from a radial inward to outward direction. These recesses 5a afford spaces wherein the inner portions of rubber ring 1a between said recesses can expand laterally. This lateral expansion relieves the circumferential stress in the inner portion of ring which would otherwise prevent said portion from deforming in an inward radial direction. Recesses 5a thus serve to eliminate the undesirable results of the stuffing effect in prior art rubber rings (mentioned above) with consequent marked improvement in uniformity of working and stress in the rubber rings when operating under load, which reduces wear and increases the durability of said rings.

Each recess 5a terminates in a nearly circular enlargement 6 which eliminates any sharp edges at the apex of the recess and thus overcomes any tendency of the rubber to tear at such points, which can produce stresses dangerous both in magnitude and direction.

The number of recesses 5a in each rubber ring 1a is determined by the need to balance the form-factors of the rubber ring 1a, with respect to the possible directions of the radial deformation of the ring, said need being greater when the ratio of the radial width $a$ to the internal diameter $b$ is large.

The principles and novel features of my invention are described above as applied to circular, cylindrical rubber rings, but my invention is equally applicable to rubber elements which are shaped in plan to correspond to other closed curves, having either uniform or variable curvatures, such for example, as elliptical, or pseudo-elliptical curves (consisting of two straight lines joined by semicircles), or open lines with various curvatures going around obstacles, or profiting in the best manner from the base space available for the spring. In such cases, my invention makes it possible to obtain a uniform distribution of the stresses at all points in the configuration of the rubber elements, since the interval between any pair of adjacent recesses in the inner portion of the ring can be proportioned to the degree of curvature of the rubber element at that part of the curve. This is illustrated, as a non-limitative example, in Figure 4, for the case of an elliptical shaped rubber element, where the distance "$n$" between adjacent recesses 5 in the more sharply curved part of the ellipse, is smaller than the corresponding distance "$m$" in the less sharper curved part of the ellipse.

For convenience of nomenclature, rubber elements having a generally ring-like form resembling an annulus but shaped in plan, according to any closed curved line, will be denoted generally as ring-like, and will be specifically distinguished as circular rings, elliptical rings, etc.

Figure 3:
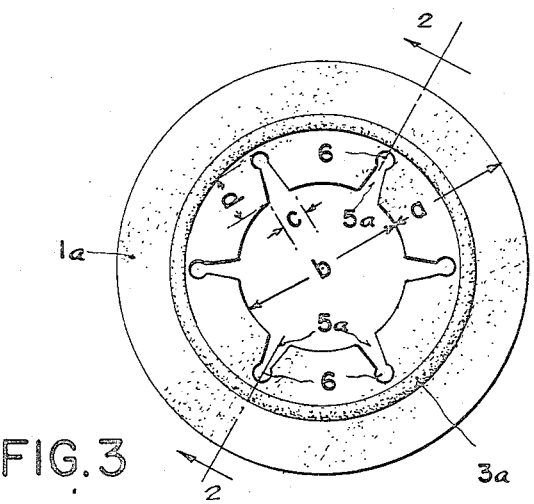
Figure 3 is a plan view of one of the rubber rings of my improved spring, as shown in Figure 2.
Figure 2:
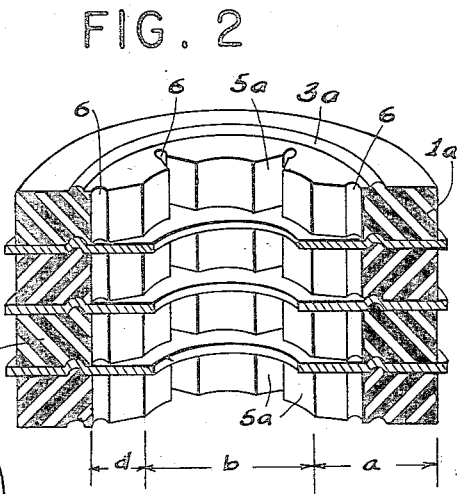
Figure 2 is a vertical sectional of a typical spring embodying my invention.
Figure 4:
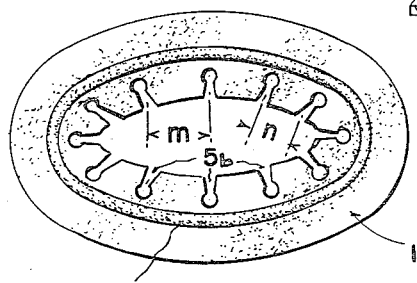
Figure 4 is a plan view of an alternate form of rubber ring, showing a modified embodiment of my invention.

In connection with the foregoing disclosure of my invention, it will be understood that, except for the novel features of the rubber elements shown in Figures 3 and 4 and described above, my improved spring is constructed and arranged in the same manner as the prior art spring shown in Figure 1, although the radial width "$a$" of the rubber ring in Figures 3 and 4 is somewhat greater than the corresponding dimension of the ring in Figure 1.

Although I have shown and described the preferred embodiments of my invention, I desire it to be understood that I do not limit myself to the particular details of construction and arrangement of elements disclosed by way of illustration, as these may be changed and modified by those skilled in the art without departing from the spirit of my invention, or exceeding the scope of the appended claims.

I claim:

1. A spring comprising a plurality of ring-like rubber elements and a plurality of rigid, flat, ring-like strips arranged alternately in a cylindrical pile adapted to receive axial compressive loads tending to cause said rubber elements to expand radially in both directions from a medial neutral line as the length of said pile decreases under load, said ring-like rubber elements each being free to exhibit such radial expansion and having an annularly spaced series of radially directed generally V-shaped notches circumferentially disposed between said neutral line and the inner periphery of the element, said notches being coextensive with the thickness of each said rubber element, and opening toward the space enclosed by the element, whereby the spring is caused to have a reduced tendency to exhibit the "stuffing effect" under axial compressive load.

2. A spring constructed in accordance with claim 1 and wherein said rubber elements are shaped in plan according to a closed curved line of varying radius and said notches are spaced at intervals which decrease as the curvature of the line increases.

3. A spring comprising a plurality of ring-like rubber elements and a plurality of ring-like rigid discs arranged alternately in a cylindrical pile adapted to receive axial compressive loads tending to cause said rubber elements to expand radially in both directions from a medial neutral line as the length of said pile decreases under load, said elements being secured to each other to form a unitary device and being provided with interfitting ribs and grooves each extending along the medial neutral line of the corresponding rubber element, each of said rubber elements being provided with a circumferentially spaced series of openings each extending entirely through such element and disposed within the space bounded by the inner periphery of said rubber elements and said interfitting ribs and grooves, whereby the spring is caused to have a reduced tendency to exhibit the "stuffing effect" under axial compressive load, the number and spacing of said openings bears a definite relation to the ratio of the radial width of said rubber elements to the internal diameter thereof.

References Cited in the file of this patent

UNITED STATES PATENTS

| | | |
|---|---|---|
| 1,483,903 | Masury | Feb. 19, 1924 |
| 1,744,551 | Karcher | Jan. 21, 1930 |
| 1,871,390 | Reynolds | Aug. 9, 1932 |
| 1,971,417 | Kingston et al. | Aug. 28, 1934 |
| 2,625,389 | Signorini | Jan. 13, 1953 |
| 2,659,595 | Coda | Nov. 17, 1953 |

UNITED STATES PATENT OFFICE
CERTIFICATE OF CORRECTION

Patent No. 2,854,232                                                   September 30, 1958

Antonio Boschi

It is hereby certified that error appears in the printed specification of the above numbered patent requiring correction and that the said Letters Patent should read as corrected below.

Column 1, line 43, for "compresible" read -- compressible --; column 2, line 47, for "radically" read -- radially --; column 3, line 8, after "elliptical", and before the comma, insert -- curves --.

Signed and sealed this 3rd day of February 1959.

(SEAL)

Attest:

KARL H. AXLINE                                             ROBERT C. WATSON

Attesting Officer                                         Commissioner of Patents